United States Patent

[11] 3,547,214

| [72] | Inventor | Raymond Ravenel<br>Sceaux, France |
|---|---|---|
| [21] | Appl. No. | 737,549 |
| [22] | Filed | June 17, 1968 |
| [45] | Patented | Dec. 15, 1970 |
| [73] | Assignee | Societe Anonyme Andre Citroen<br>Paris, France |
| [32] | Priority | June 22, 1967 |
| [33] | | France |
| [31] | | No. 3,372 |

[54] FITTING OF ENGINE UNITS OF AUTOMOTIVE VEHICLE
4 Claims, 3 Drawing Figs.

[52] U.S. Cl. ..................................... 180/42,
180/54, 180/70
[51] Int. Cl. ....................................... B60k 5/02,
B60k 17/30
[50] Field of Search ........................................ 180/42, 70,
72, 75, 64, 54

[56] References Cited
UNITED STATES PATENTS

| 1,769,038 | 7/1930 | Ronning et al. | 180/42X |
| 2,233,318 | 2/1941 | Lewis et al. | 180/70X |
| 2,401,796 | 6/1946 | Raitch | 180/72X |
| 3,305,040 | 2/1967 | Cadiou | 180/42X |

*Primary Examiner*—A. Harry Levy
*Attorney*—Karl F. Ross

ABSTRACT: An automotive vehicle comprising an engine block disposed on a chassis and lying longitudinally relative to said vehicle and at the same end of the chassis as a set of driving wheels. At least one gearbox output shaft is connectable to an adjacent wheel shaft by means of a chain or pinion gear disposed in a casing secured to said chassis so that the axis of the output shaft of the gear is itself fixed relatively to the chassis. The chassis or casing supports a brake mechanism capable of acting on the output shaft.

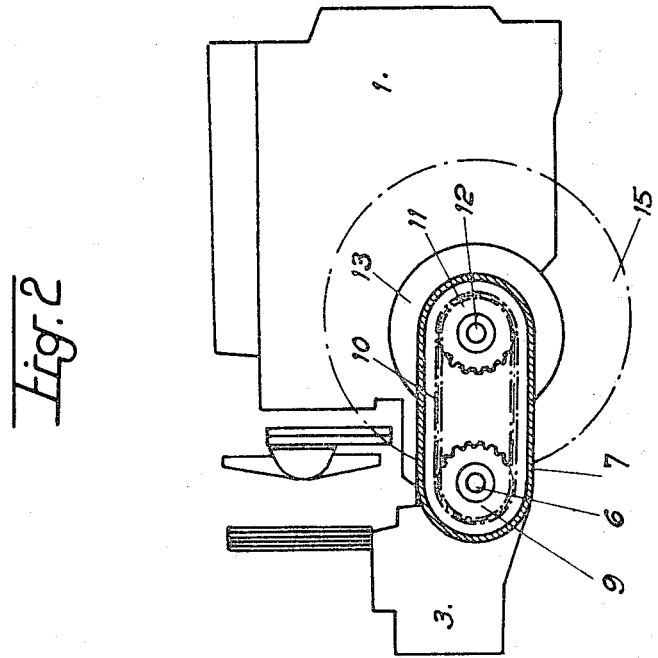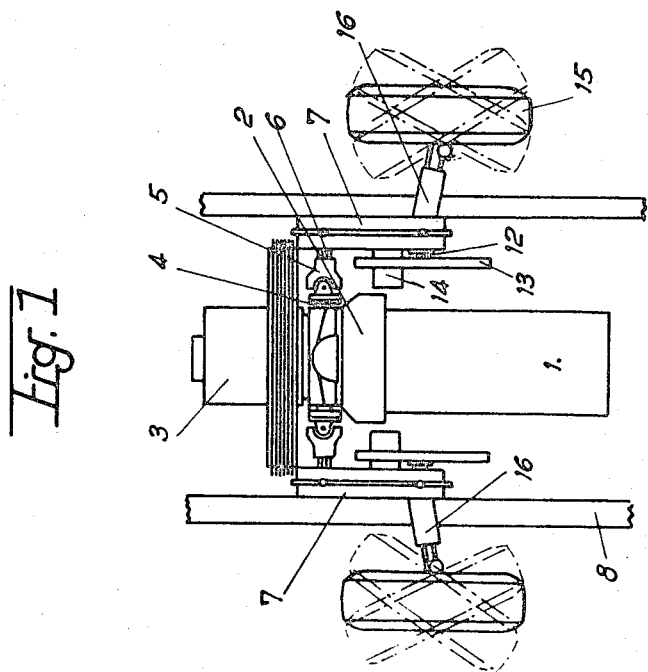

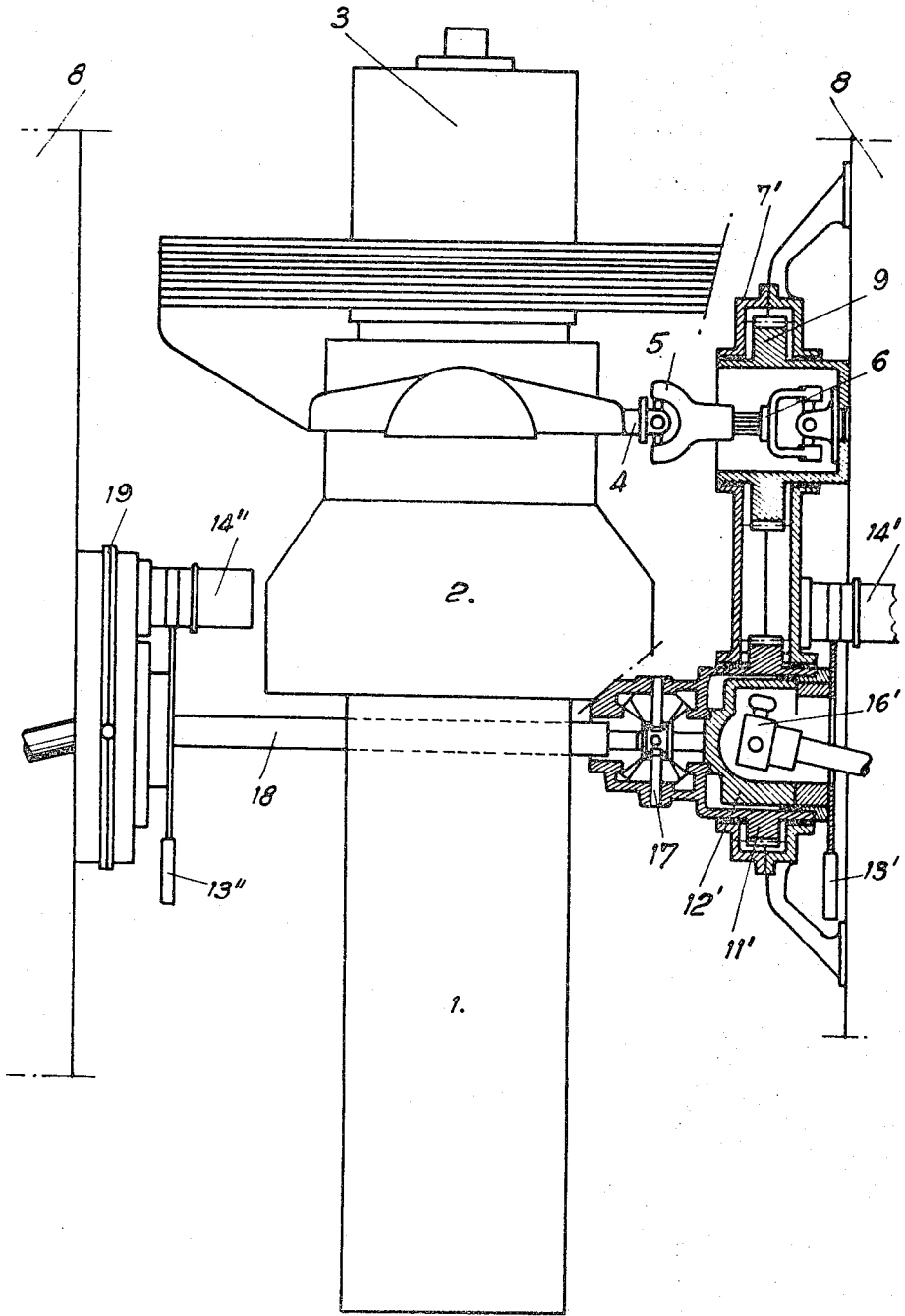

FITTING OF ENGINE UNITS OF AUTOMOTIVE VEHICLE

The present invention concerns improvements in or relating to the fitting of the engine block of an automotive vehicle, the engine block of which, comprising the engine, clutch, and gearbox, lies longitudinally relatively to the vehicle at the same end of the chassis as the driving wheels, i.e., at the front in the case of a vehicle having front traction or at the rear in the case of a vehicle having rear propulsion.

This invention more particularly concerns vehicles of the type in which the output shaft of the gearbox, or each of the output shafts, is connected to the adjacent wheel shaft by means of a chain or pinion gear disposed in a casing.

According to the invention, an automotive vehicle, the engine block of which is disposed longitudinally relatively to the vehicle and at the same end of the chassis as the driving wheels and in which the gearbox output shaft or each of the gearbox output shafts is connectable to the adjacent wheel shaft by means of a chain or pinion gear disposed in a casing, has the casing secured to the chassis so that the axis of the output shaft of the gear is itself fixed relatively to the chassis. The chassis or the casing also supports a brake mechanism capable of acting on the said output shaft.

Because of the arrangement of the invention, the suspension of the engine unit relative to the chassis may be simplified; in fact, the supports of the unit are no longer subjected to the reaction of the engine torque which is mainly applied in a direction corresponding to the forward movement of the vehicle and the braking torque has no effect on the supports.

The gearbox may comprise two output shafts, each of which is connected by a chain or pinion gear to the wheel shaft disposed on the same side as the gearbox.

THe gearbox may similarly, but alternatively, comprise only one output shaft which is connected by a chain or pinion gear to the wheel shaft situated on the same side as the gearbox, the gear output shaft being also connected to the other wheel shaft by a transverse transmission shaft through a casing relay.

The invention will be described further, by way of example, with reference to the accompanying drawing, in which:

FIG. 1 is a plan view of an engine block and transmission, according to a first embodiment of the invention;

FIG. 2 is a front view in partial cross section of the members of FIG. 1; and

FIG. 3 is a plan view of a second embodiment.

FIGS. 1 and 2 show an engine block comprising an engine 1, a clutch 2 and a gearbox 3, the engine block being arranged longitudinally of the vehicle, i.e. its major dimension lies along the major dimension of the chassis.

The gearbox comprises two lateral output shafts 4, between which a differential is disposed and each of the shafts 4 is connected by an articulated sliding universal joint 5 to a further shaft 6. The shaft 6 is mounted to be rotatable in a gear casing 7 which is fixed to the chassis 8 of the vehicle. The shaft 6 supports a pinion 9 which is connected by a chain 10 to a pinion 11 keyed on a shaft 12: this shaft 12 is mounted to be rotatable in the casing 7 and carries a brake disk 13 with which a brake mechanism 14 carried by the casing 7 cooperates. Each of the shafts 12 drives the adjacent wheel 15 by means of an articulated sliding universal joint 16.

In the embodiment shown in FIG. 3, the gearbox 3 comprises only one lateral output shaft 4 which is connected in the manner previously stated to the wheel disposed on the same side as said gearbox (with respect to the longitudinally extending central vehicle plane of the vehicle) i.e. it is connected by means of a chain gear which is located in a casing 7' secured to the chassis 8 and drives a pinion 11'. The pinion 11' is connected to a differential 17 which drives a shaft 12' mounted so as to rotate in the pinion 11'. The shaft 12' carries a brake disk 13' with which a brake mechanism 14' cooperates carried by the casing 7'.

The differential 17 drives a transverse transmission shaft 18 disposed below the engine 1 and on the side opposed to the shaft 12'. At its end opposed to the differential 17, the shaft 18 is mounted to rotate in a relay casing 19 secured to the chassis 8. Furthermore, the casing 19 supports a brake mechanism 14'' similar to the brake mechanism 14' an cooperating with a disk 13'' fixed to the shaft 18.

As in the embodiment shown in FIG. 1, each of the shafts 12' and 18 drives the adjacent wheel by means of an articulated sliding joint 16'.

It will be seen from the foregoing description that the brake mechanism 14, 14' and 14'' are connected to the chassis 8 and thus the engine block is never subjected to the braking torque; the block is only subjected to the reaction of the driving torque.

I claim:

1. An automotive vehicle comprising:

an elongated chassis extending generally in the direction of vehicle movement;

a set of driving wheels suspended from said chassis toward an end thereof and disposed along opposite flanks of said chassis, said chassis having a vertical longitudinally extending central plane;

an engine suspended on said chassis and including an elongated engine block lying in the longitudinal direction of the chassis at said end thereof;

a gearbox connected to said engine and having at least one output shaft projecting laterally of said gearbox to one side of said plane;

a casing on said chassis along said side of said plane and extending approximately from the region of said output shaft to the region of a corresponding one of said wheels, and toothed transmission means in said casing having a rotatable input member proximal to said output shaft and a rotatable output member proximal to said one of said wheels;

first universal joint means connecting said output shaft with said input member;

second universal joint means connecting said output member with said one of said wheels;

a first brake element carried by said output member;

a first brake means on said casing cooperating with said brake element for braking rotation of said one of said wheels; and second means on said vehicle for driving said other of said wheels and including a corresponding brake element and brake means.

2. An automotive vehicle as defined in claim 1 wherein said second means includes an output shaft projecting from said gearbox laterally to the opposite sides of said plane, a further casing being provided on said chassis along the other side of said plane opposite the first-mentioned casing and receiving respective toothed transmission means coupling a rotatable input member and a rotatable output member, said rotatable input member of the second casing being connected to said last-mentioned output shaft and said output member being connected to a respective one of said wheels by respective universal joint means, said corresponding brake means and brake element being secured to said second casing and said output member of said second casing respectively.

3. The automotive vehicle defined in claim 1, wherein said second means comprises a relay casing mounted on said chassis, a transverse transmission shaft connected to the other of said wheels and spanning said chassis; a differential having an input connected to said output member and a first drive output member including said universal joint means connected to said one of said wheels, and a second drive output member connected with said traverse shaft, said transmission shaft having an output end extending into said relay casing universally jointed means connecting said output end and said other wheels, said corresponding brake means and brake element secured to said relay casing and transmission shaft respectively for cooperation therebetween.

4. The automotive vehicle defined in claim 1 wherein said input member is a first toothed wheel journaled in said casing, said output member is a second toothed wheel journaled in said casing, and said transmission means includes a chain interconnecting said toothed wheels, said first and corresponding brake elements and means being formed as brake disks and brake mechanisms respectively, said brake mechanisms being engageable with said disks.